(12) United States Patent
Slagle et al.

(10) Patent No.: US 6,330,113 B1
(45) Date of Patent: Dec. 11, 2001

(54) COLOR SEPARATION PRISM WITH ADJUSTABLE PATH LENGTHS

(75) Inventors: Timothy M. Slagle, Menlo Park; Richard F. Lyon, Los Altos, both of CA (US); Mitchell C. Ruda; Tilman W. Stuhlinger, both of Tucson, AZ (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/676,192

(22) Filed: Sep. 28, 2000

(51) Int. Cl.[7] .............................. G02B 27/14; H04N 9/07
(52) U.S. Cl. ........................ 359/634; 348/337; 348/338
(58) Field of Search ............................... 359/583, 634; 348/336, 337, 338, 339

(56) References Cited

U.S. PATENT DOCUMENTS

| | | | |
|---|---|---|---|
| 5,134,468 | 7/1992 | Ohmuro | 358/50 |
| 5,777,674 | * 7/1998 | Ohmuro | 348/338 |
| 6,238,051 | * 5/2001 | Huang | 353/81 |

FOREIGN PATENT DOCUMENTS

02000266915A * 9/2000 (JP) .................. G02B/5/04

* cited by examiner

Primary Examiner—Ricky Mack
(74) Attorney, Agent, or Firm—Sierra Patent Group, Ltd.

(57) ABSTRACT

A color-separation prism assembly comprises first, second and third prisms. The first and second prisms have entrance surfaces, exit surfaces, and partially-reflecting surfaces, wherein the entrance surface of the second prism is separated by an air gap from the partially-reflecting surface of the first prism. The third prism has an entrance surface and an exit surface, wherein the entrance surface of the third prism is adjacent to the partially-reflecting surface of the second prism. The first prism has a cut-out serving as a flare-stop stop, and providing relief so as to allow the entrance surface of the third prism to slide across a plane disposed over the cut-out into a volume defined by the cut-out. The plane is formed as an extension of the partially-reflecting surface of the first prism. An optical axis passes through the first, second and third prisms. The optical axis passes at normal angles through the entrance surface of the first prism, and the exit surfaces of the first, second and third prisms. The partially reflecting surfaces each have angles-of-incidence of less than 30° relative to the optical axis.

2 Claims, 2 Drawing Sheets

COLOR SEPARATION PRISM WITH ADJUSTABLE PATH LENGTHS

BACKGROUND OF THE INVENTION

1. Field of the Invention

The present invention relates generally to a color-separation prism assembly, and more particularly relates to a color-separator prism with adjustable path lengths.

2. The Prior Art

A number of color-separation prism designs have been in widespread use. A well-known design is the so-called "Philips" prism assembly. A lateral cross-section of a prior art Philips prism assembly is shown in FIG. 1. A Philips prism assembly is formed of three individual prisms, a first prism 10, a second prism 12 and a third prism 14, each of which has certain flat, optically polished surfaces. First prism 10 has optical surfaces 16, 18 and 20. Second prism 12 has optical surfaces 22, 24 and 26. Third prism 14 has optical surfaces 28 and 30. In addition to their optical finish, surfaces 18 and 22 (or 28) have multi-layer dichroic coatings that cause them to have graded reflection versus wavelength to make filter functions that are approximately color matching functions. Some unwanted far-off-axis rays may find one-bounce or three-bounce paths to the exit surface of the first prism 10. A flare-stop notch 32 is provided in first prism 10 to block such unwanted light paths that would otherwise cause flare without blocking desired ray paths, as is readily understood by persons of ordinary skill in the art.

The Philips prism assembly operates in the following manner: a ray 40 of light from the incoming image enters first prism 10 at normal incidence through surface 16. Most of the blue light in the ray (wavelengths shorter than about 500 nanometers) is reflected to form ray 42, while the remainder of the light is transmitted to form ray 44. Ray 42 is totally internally reflected from surface 16 to form ray 46, which passes through surface 20 at normal incidence to form the blue output of the assembly. Most of the red light in the ray 44 (wavelengths greater than about 580 nanometers) is reflected off surface 22 to form ray 48, which is totally internally reflected from surface 24 to form ray 50, which passes through surface 26 at normal incidence to form the red output of the assembly. The remainder of the light passes into third prism 14 to form ray 52, which passes through surface 30 at normal incidence to form the green output of the assembly. Other rays entering at non-normal incidence follow corresponding nearby paths.

It is understood that the wavelengths quoted are typical of industrial practice, and can vary somewhat in different applications, as is well understood by those of ordinary skill in the art. Such skilled persons are aware that the crossover wavelength (the wavelength of transition between transmission and reflection) of a typical dichroic coating is insensitive to polarization at normal incidence (0 degree angle-of-incidence, ray perpendicular to surface), but becomes increasingly sensitive to polarization as the angle of incidence is increased. A first advantage of the Philips prism assembly is based on this fact. Both surface 18 and surface 22 are operating at less than 30° angle of incidence. For this reason, the crossover wavelength for polarizations in and perpendicular to the page are nearly equal, and excellent color separation results. A second advantage of the Philips prism assembly is that the green ray 52 exits the assembly having encountered no reflections, while red ray 50 and blue ray 44 exit the assembly having encountered two reflections so that none of the exiting rays are mirrored by having an odd number of reflections. Another advantage of the Philips prism assembly is that the individual prisms can be slid relative to each other to adjust the lengths of the three optical paths to be the same.

The disadvantages of a Philips assembly stem from the total internal reflection of ray 48 on surface 24 to form ray 50. The requirement of total internal reflection from surface 24 requires an air gap 54 between the two surfaces. This air gap 54 must be fairly uniform and securely held, and must be protected from moisture accumulation. The two-reflection paths of rays 44 and 50 also lengthen the optical length to over 2 times the width of an exit face, which requires the use of lenses with a longer back working distance.

Additionally, the third prism 14 of the Philips prism assembly has limited slide movement along the second prism 12 toward the first prism 10, since the surface 18 of the first prism 10 creates an obstruction. In order to increase the adjustable optical path length to the output faces for the prism assembly, the third prism 16 needs to be able to traverse further across the second prism 14 toward the first prism 10 than is possible in the prior art.

BRIEF DESCRIPTION OF THE INVENTION

A color-separation prism assembly according to the present invention comprises first, second and third prisms. The first and second prisms have entrance surfaces, exit surfaces, and partially-reflecting surfaces. The entrance surface of the second prism is separated by an air gap from the partially-reflecting surface of the first prism. The third prism has an entrance surface and an exit surface. The entrance surface of the third prism is adjacent to the partially-reflecting surface of the second prism.

The first prism has a cut-out serving as a flare-stop, and providing relief so as to allow the entrance surface of the third prism to slide across a plane disposed over the cutout into a volume defined by the cut-out. The plane is formed as an extension of the partially-reflecting surface of the first prism. An optical axis passes through the first, second and third prisms. The optical axis passes at normal angles through the entrance surface of the first prism, and the exit surfaces of the first, second and third prisms. The partially reflecting surfaces each have angles-of-incidence of less than 30° relative to the optical axis.

The modified Philips prism assembly of the present invention allows the third prism greater slide movement thereby increasing the ability of the prism assembly to adjust the optical path lengths to the output faces.

BRIEF DESCRIPTION OF THE DRAWING FIGURES

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

The present invention is a color separation prism assembly, and more particularly is a color separation prism assembly with adjustable path lengths. The increased path length adjustability is made possible by cutting a flare-stop notch with extra relief in the first prism so as to remove obstruction to the slide movement of the third prism. The increased slide movement of the third prism increases the ability of the prism assembly to adjust the optical path lengths to the output faces.

Figure 1:
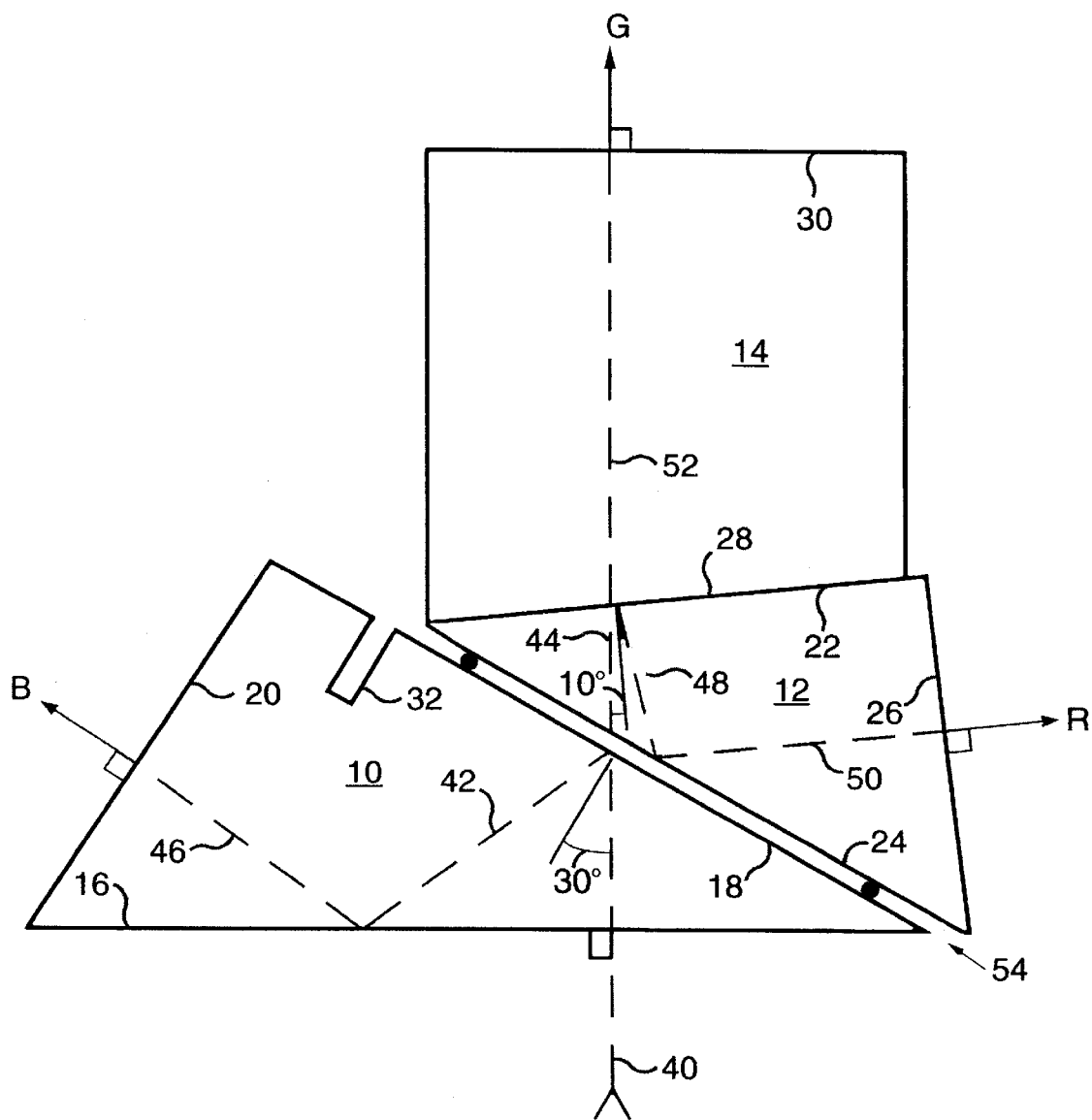
FIG. 1 is a cross-section of a prior art Philips prism assembly.
Figure 2:
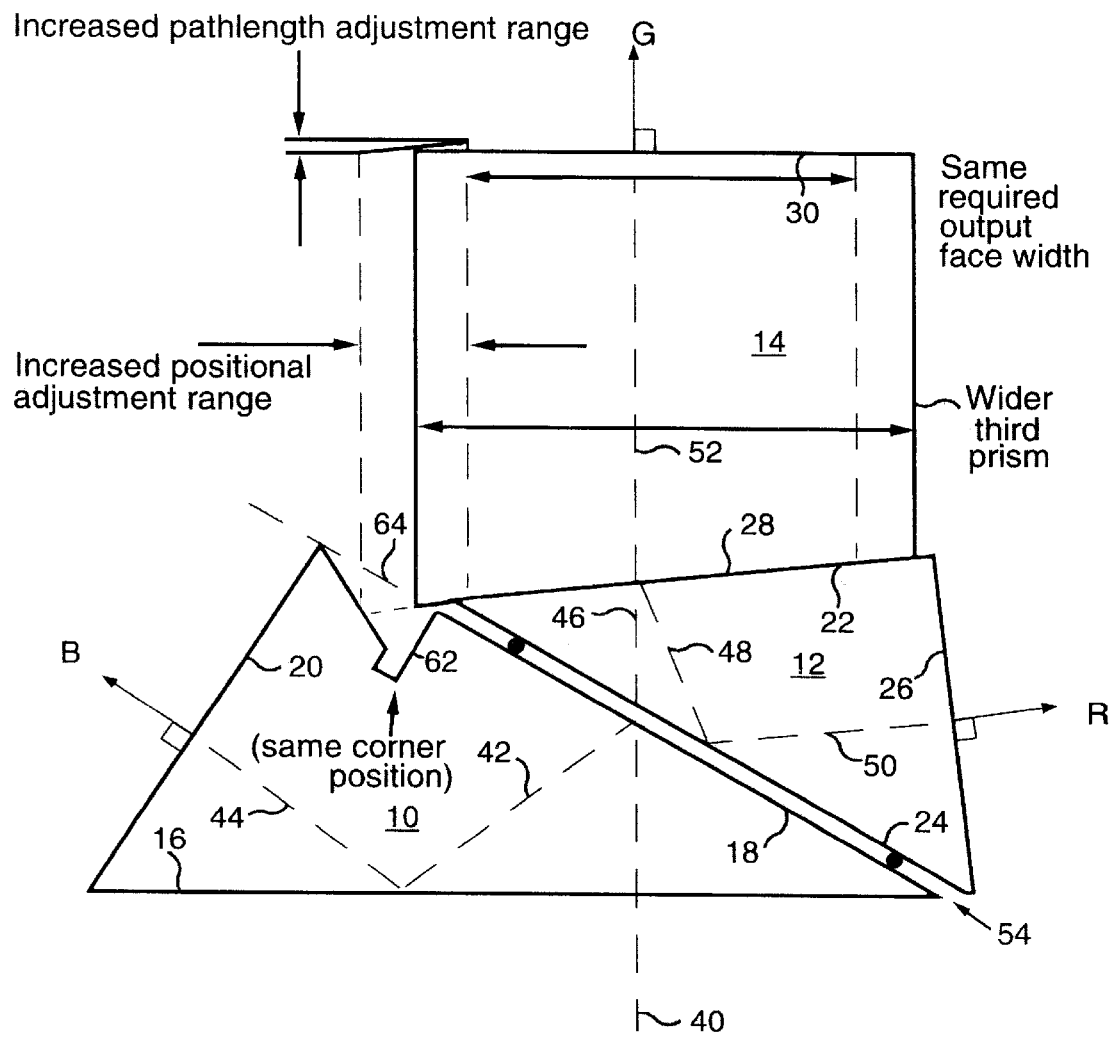
FIG. 2 is a cross-section of an illustrative color-separation prism assembly according to the present invention.

A cross-section of a color-separation prism assembly 60 of the present invention is shown in FIG. 2. It is understood that, as in the prior art example of FIG. 1, the actual prism assembly 60 depicted in FIG. 2 has a thickness perpendicular to the page that is not shown in the figure, and that FIG. 2 is typical of any cross section parallel to the surface of the page. For simplicity, elements in FIG. 2 that correspond to elements in FIG. 1 will be identified by the same reference numerals as their counterparts in FIG. 1.

The assembly 60 is made of three elementary prisms, a first prism 10, a second prism 12 and a third prism 14. These prisms are preferably made of optical glass, but may also be constructed of optically molded plastic or other suitable optical grade material.

According to a preferred embodiment of the present invention, the first prism 10 has an entrance surface 16 through which incident ray 40 enters the prism assembly 60. The partially-reflecting surface 18 of the first prism 10 reflects blue light (typically) to form ray 42. Ray 42 is internally reflected from entrance surface 16 of the first prism 10 to form ray 44, which then passes through the exit surface 20 of the first prism 10 to form the blue output of the prism assembly 60.

The remainder of the light in ray 40 passes through the partially-reflecting surface 18 of the first prism 10, air gap 54 separating first and second prisms 10 and 12, and the entrance surface 24 of the second prism 12 to form ray 46. Red light (typically) reflects from the partially-reflecting surface 22 of the second prism 12, and forms ray 48. The back surface 22 of prism 12 is referred to herein as a partially-reflecting surface, even if some or all of the reflecting coating layers are actually form on the front surface 28 of the third prism 14. Ray 48 is internally reflected from the entrance surface 24 of the second prism 12, then passes through the exit surface 26 of the second prism 12 to form the red output 50 of the prism assembly 60.

The remaining light in ray 46 passes through the partially-reflecting surface 22 of the second prism 12 and the entrance surface 28 of the third prism 14 to form ray 52. Ray 52 passes through the exit surface 30 of the third prism 14 to form the green output of the prism assembly 60.

According to a preferred embodiment of the present invention, the first prism 10 has a cut-out 62, which may be in the form of a notch or a step. The cut-out 62 serves as a flare-stop notch, as is known by those of ordinary skill in the art, and provides relief so as to allow the entrance surface 28 of the third prism 14 to slide unobstructed along the partially-reflecting surface 22 of the second prism 12. The cut-out 62 allows the third prism 14 to slide across a plane 64, indicated by dashed lines, disposed over the cut-out 62 into a volume defined by the cut-out 62. The plane 64 is formed from an extension of the partially-reflecting surface 18 of the first prism 10. The increased range of slide movement for the third prism 14 can be used to adjust the optical path lengths to the exit surfaces 26, and 30 of the prism assembly 60 relative to the fixed optical pathlength to exit surface 20 of first prism 10.

As is readily understood by those of ordinary skill in the art, the optical paths to each color output must be of equal length so that the image planes are simultaneously in focus. The path length changes in proportion to the slant slide distance, with a coefficient that is the sine of the angle-of-incidence of the prism being slid. For example, in a preferred embodiment of the invention, the second prism 12 has an angle-of-incidence of 28° and the third prism 14 has an angle-of-incidence of 10°. Therefore, the path length changes by sin(28)=0.47 times the slide movement for the second prism 12 sliding on the first prism 10, while the path length change is only sin(10) =0.17 times the slide distance for the third prism 14 sliding on the second prism 12. Due to the low change coefficient for the third prism 14, extra positional adjustment and corresponding extra-width for the third prism 14 are needed. The present invention, by expanding the flare stop notch of the prior-art prism assembly to remove the obstruction by the first prism 10 of the movement of the corner of the third prism 14, allows the needed extra width and positional adjustment as illustrated in FIG. 2.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A color-separation prism assembly comprising:

a first and second prism, said first and second each prism having an entrance surface, an exit surface, and a partially-reflecting surface, wherein said entrance surface of said second prism is separated by an air gap from said partially-reflecting surface of said first prism;

a third prism having an entrance surface and an exit surface, wherein said entrance surface of said third prism is adjacent to said partially-reflecting surface of said second prism;

said first prism having a cut-out, said cut-out serving as a flare-stop, and providing relief so as to allow said entrance surface of said third prism to slide along said partially reflecting surface of said second prism into a volume defined by said cutout;

an optical axis passing through said first, second and third prisms, said optical axis passing through said entrance surface of said first prism, and said exit surfaces of said first, second and third prisms at normal incidence; and said partially reflecting surfaces having angles of incidence of less than 30° relative to said optical axis.

2. A color-separation prism assembly comprising:

a first prism and a second prism each having an entrance surface, an exit surface, and a partially-reflecting back surface, wherein said entrance surface of said second prism is separated by an air gap from said partially-reflecting surface of said first prism;

a third prism having an entrance surface and an exit surface, wherein said entrance surface of said third prism is adjacent to said partially-reflecting surface of said second prism;

means for permitting said third prism to slide along said partially-reflecting surface of said second prism into a volume bounded by a plane formed as an extension of said partially-reflecting surface of said first prism;

an optical axis passing through said first, second and third prisms, said optical axis passing through said entrance surface of said first prism, and said exit surfaces of said first, second and third prisms at normal incidence; and said partially reflecting surfaces having angles of incidence of less than 30° relative to said optical axis.

* * * * *